United States Patent
Tanaka

(10) Patent No.: US 8,300,202 B2
(45) Date of Patent: Oct. 30, 2012

(54) LIQUID CRYSTAL DISPLAY PANEL AND METHOD FOR MANUFACTURING THE SAME

(75) Inventor: Shigeki Tanaka, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 331 days.

(21) Appl. No.: 12/674,241

(22) PCT Filed: Jul. 18, 2008

(86) PCT No.: PCT/JP2008/001932
§ 371 (c)(1),
(2), (4) Date: Feb. 19, 2010

(87) PCT Pub. No.: WO2009/031263
PCT Pub. Date: Mar. 12, 2009

(65) Prior Publication Data
US 2012/0019762 A1   Jan. 26, 2012

(30) Foreign Application Priority Data

Sep. 7, 2007   (JP) ................................. 2007-232482

(51) Int. Cl.
*G02F 1/1339* (2006.01)
(52) U.S. Cl. ........................................ 349/156; 349/153
(58) Field of Classification Search ........... 349/153–156
See application file for complete search history.

(56) References Cited

U.S. PATENT DOCUMENTS 6,864,946 B2 * 3/2005 Kim .............................. 349/156
2007/0002258 A1    1/2007 Wu

FOREIGN PATENT DOCUMENTS

JP   2000-199891   7/2000
JP   2006-251066   9/2006

OTHER PUBLICATIONS

International Search Report for PCT/P2008/001932, mailed Oct. 21, 2008.

* cited by examiner

*Primary Examiner* — Dung T. Nguyen
(74) *Attorney, Agent, or Firm* — Nixon & Vanderhye P.C.

(57) ABSTRACT

A liquid crystal display panel (50*a*) includes a pair of substrates arranged, facing each other, a liquid crystal layer provided between the pair of substrates, and a frame-like sealing member (25) configured to bond the pair of substrates with each other and enclose the liquid crystal layer. A cavity forming wall (18*ba*) is provided on one of the pair of substrates between the liquid crystal layer and the sealing member (25) and is configured to form a cavity region (C) therein by an upper end of the cavity forming wall contacting the other of the pair of substrates. The cavity region (C) is configured so that, when an excessive amount of a liquid crystal material which foims the liquid crystal layer is enclosed, the cavity forming wall is destroyed to cause a portion of the liquid crystal material to flow into the cavity region (C).

10 Claims, 7 Drawing Sheets

LIQUID CRYSTAL DISPLAY PANEL AND METHOD FOR MANUFACTURING THE SAME

This application is the U.S. national phase of International Application No. PCT/JP2008/001932, filed 18 Jul. 2008, which designated the U.S. and claims priority to Japanese Application No, 2007-232482, filed 7 Sep. 2007, the entire contents of each of which are hereby incorporated by reference.

TECHNICAL FIELD

The present invention relates to liquid crystal display panels and methods for manufacturing the liquid crystal display panels. More particularly, the present invention relates to liquid crystal display panels manufactured by the one drop fill method.

BACKGROUND ART

In liquid crystal display panels, a pair of substrates arranged facing each other are joined with each other via a sealing member for enclosing a liquid crystal layer. A spacer is interposed between the pair of substrates so that the substrates are held and separated with a predetermined gap therebetween.

For example, PATENT DOCUMENT 1 discloses a flexible liquid crystal display panel including two film substrates and a sealing member which is provided around a side portion of a gap layer to seal the gap layer. A liquid crystal is enclosed in the sealed gap layer. The integrated film substrates can be freely bent. The gap layer includes liquid holding portions which, when the film substrates are bent in the shape of a curve, hold an extra amount of the liquid crystal which is moved toward the ends of the curve. PATENT DOCUMENT 1 also describes that this liquid crystal display panel can substantially prevent a defective gap of the liquid crystal due to curved bending, thereby providing a curved surface shape without hindering liquid crystal display.

CITATION LIST

Patent Document

PATENT DOCUMENT 1: Japanese Laid-Open Patent Publication No, 2000-199891

SUMMARY OF THE INVENTION

Technical Problem

Incidentally, in recent years, the one drop fill method has attracted attention as a method for enclosing a liquid crystal layer between the pair of substrates. In the one drop fill method, a liquid crystal material is dropped onto a surface of one of the substrates before joining the substrates with each other via a sealing member formed in the shape of a closed frame, thereby enclosing the liquid crystal material (liquid crystal layer).

In the one drop fill method, a predetermined volume surrounded by the closed frame of the sealing member needs to be filled with exactly the same volume of the liquid crystal material. However, the liquid crystal material may be excessively supplied, so that the excessive amount of the liquid crystal material may be enclosed in the region surrounded by the sealing member between the substrates. In this case, the liquid crystal display panel is likely to swell at a region away from the sealing member, and therefore, the gap between the substrates, i.e., a cell gap, is likely to be partially enlarged. As a result, in this liquid crystal display panel, a spacer for keeping the substrates separated at a predetermined gap does not support the substrate surface, and therefore, when an external force (e.g., a vibration, etc.) is applied to the liquid crystal display panel, the cell gap changes, which causes a display disturbance.

The present invention has been made in view of the aforementioned problem. It is an object of the present invention to provide a liquid crystal display panel which substantially reduces the excessive cell gap when an excessive amount of liquid crystal material is enclosed.

Solution to the Problem

In order to achieve the aforementioned object, in the present invention, when an excessive amount of a liquid crystal material is enclosed, a portion of the liquid crystal material is caused to flow into a cavity region formed by a cavity forming wall.

Specifically, a liquid crystal display panel according to the present invention includes a pair of substrates arranged, facing each other, a liquid crystal layer provided between the pair of substrates, and a frame-like sealing member configured to bond the pair of substrates with each other and enclose the liquid crystal layer. A cavity forming wall is provided on one of the pair of substrates between the liquid crystal layer and the sealing member and is configured to form a cavity region therein by an upper end of the cavity forming wall contacting the other of the pair of substrates. The cavity region is configured so that, when an excessive amount of a liquid crystal material which forms the liquid crystal layer is enclosed, the cavity forming wall is destroyed to cause a portion of the liquid crystal material to flow into the cavity region.

With this configuration, the upper end of the cavity forming wall provided on one of the substrates contacts the other substrate, so that the cavity forming wall forms a cavity region between the pair of substrates. Therefore, the cavity region is adjacent via the cavity forming wall to the liquid crystal layer enclosed between the pair of substrates by the frame-like sealing member. Therefore, if an excessive amount of the liquid crystal material is enclosed, the cavity forming wall is destroyed to cause a portion of the liquid crystal material to flow into the cavity region through a destroyed portion of the cavity forming wall. As a result, an extra amount of the liquid crystal material which causes an excessive cell gap is moved into the cavity region, whereby the excessive cell gap is corrected. Therefore, in a liquid crystal display panel in which an excessive amount of a liquid crystal material is enclosed, an excessive cell gap is substantially reduced.

The cavity forming wall may be configured to have opposite ends contacting the sealing member.

With this configuration, the opposite ends and the upper end of the cavity forming wall provided on one of the substrates contact the sealing member and the other substrate, respectively. Therefore, a cavity region surrounded by the sealing member and the cavity forming wall is formed between the pair of substrates.

A display region which contributes to display and a frame region which is provided around the display region and does not contribute to display, may be provided. A frame-like light shielding layer may be provided in the frame region of the one of the pair of substrates. The cavity fouling wall may be provided, overlapping the light shielding layer.

With this configuration, the cavity forming wall and the cavity region are formed in the frame region in which the light shielding layer is provided and does not contribute to display. Therefore, an excessive cell gap can be corrected without affecting display.

The cavity forming wall may be provided at four corner portions of the sealing member.

With this configuration, as there are generally not many wirings for display (e.g., lead wirings for gate lines and source lines, etc.) at the four corner portions of the sealing member, the cavity forming wall is formed while substantially reducing its overlapping the display wirings. Therefore, bumps on the upper end of the cavity forming wall are reduced, and therefore, the tightness between the upper end of the cavity forming wall and a surface of the other substrate is improved, whereby the cavity region can be reliably formed.

The cavity forming wall may be provided, extending along a side of the sealing member.

With this configuration, for instance, the cavity forming wall is provided along a side of the sealing member which is located at a lower portion when the liquid crystal display panel is caused to stand upright. Therefore, when the cavity forming wall is destroyed, an extra amount of the liquid crystal material is caused to quickly flow into the cavity region due to the action of the force of gravity, whereby an excessive cell gap can be quickly corrected.

The cavity forming wall may be provided, extending along each side of the sealing member.

With this configuration, the cavity forming wall is provided along each side of the sealing member, and therefore, the capacity of the cavity region for causing an extra amount of a liquid crystal material to flow thereinto can be increased.

The cavity forming wall may has a partition wall having a tip end contacting the sealing member and an upper end contacting the other of the pair of substrates, thereby dividing the cavity region into a plurality of parts.

With this configuration, the cavity region is divided into a plurality of parts by the partition wall, and therefore, an excessive cell gap can be corrected by causing the liquid crystal material to flow into a part or parts of the cavity region corresponding to an extra amount of the liquid crystal material.

The plurality of parts of the cavity regions separated by the partition wall may have different sizes.

With this configuration, the parts of the cavity region have different sizes, and therefore, an excessive cell gap can be corrected by causing the liquid crystal material to flow into a part of the cavity region having a size corresponding to an extra amount of the liquid crystal material.

The plurality of parts of the cavity regions separated by the partition wall may have equal sizes.

With this configuration, the parts of the cavity region have equal sizes, and therefore, an excessive cell gap can be corrected by causing the liquid crystal material to flow into a part or parts of the cavity region the number of which corresponds to an extra amount of the liquid crystal material.

The cavity forming wall may have a wall protruding toward the sealing member so as to substantially reduce backflow of a fluid.

With this configuration, the cavity forming wall has the protruding wall for substantially reducing backflow of a fluid, and therefore, when a vacuum bubble is present between the liquid crystal layer and the sealing member, the vacuum bubble flowing into the display region is substantially reduced.

A resin layer may be provided on one of the pair of substrates in a display region which contributes to display, and the cavity fog ning wall may be formed in the same layer as and of the same material as those of the resin layer.

With this configuration, the cavity forming wall is formed in the same layer as and of the same material as those of the resin layer, and therefore, the cavity forming wall can be formed on the one substrate without providing an additional manufacturing step.

Moreover, a method for manufacturing a liquid crystal display panel according to the present invention is provided. The liquid crystal display panel includes a pair of substrates arranged, facing each other, a liquid crystal layer provided between the pair of substrates, and a frame-like sealing member configured to bond the pair of substrates with each other and enclose the liquid crystal layer. A cavity forming wall is provided on one of the pair of substrates between the liquid crystal layer and the sealing member and is configured to form a cavity region therein by an upper end of the cavity forming wall contacting the other of the pair of substrates. The method includes a panel fabricating step of joining the pair of substrates with each other with the liquid crystal layer, the sealing member and the cavity forming wall being interposed therebetween, and thereafter, curing the sealing member, to enclose the liquid crystal layer between the pair of substrates and form the cavity region, a cell gap measuring step of measuring a gap between the pair of substrates joined with each other in the panel fabricating step, and a cell gap correcting step of destroying the cavity forming wall to cause a portion of the liquid crystal material forming the liquid crystal layer to flow into the cavity region, where the cell gap correcting step is performed when the gap between the pair of substrates measured in the cell gap measuring step is larger than a predetermined distance.

With this method, in the liquid crystal display panel fabricated in the panel fabricating step, the upper end of the cavity forming wall provided on one of the substrates contacts the other substrate, so that the cavity forming wall forms a cavity region between the pair of substrates. Therefore, the cavity region is adjacent via the cavity forming wall to the liquid crystal layer enclosed between the pair of substrates by the frame-like sealing member. Therefore, if it is determined in the cell gap measuring step that the measured gap between the pair of substrates is larger than the predetermined distance, i.e., an excessive amount of the liquid crystal material is enclosed, the cavity forming wall is destroyed to cause a portion of the liquid crystal material to flow into the cavity region through a destroyed portion of the cavity forming wall in the cell gap correcting step. As a result, an extra amount of the liquid crystal material which causes an excessive cell gap is moved into the cavity region, whereby the excessive cell gap is corrected. Therefore, in a liquid crystal display panel in which an excessive amount of a liquid crystal material is enclosed, an excessive cell gap is substantially reduced.

In the cell gap correcting step, the cavity forming wall may be destroyed by laser irradiation.

With this method, the cavity forming wall is destroyed by laser irradiation with high accuracy in the cell gap correcting step, so that a portion of the liquid crystal material flows into the cavity region through a destroyed portion of the cavity forming wall, thereby an excessive cell gap is effectively corrected.

Advantages of the Invention

According to the present invention, when an excessive amount of a liquid crystal material is enclosed, a portion of the liquid crystal material is caused to flow into a cavity region formed by a cavity forming wall. As a result, in a liquid crystal display panel in which an excessive amount of a liquid crystal material is enclosed, an excessive cell gap can be substantially reduced.

BRIEF DESCRIPTION OF THE DRAWINGS

FIG. 3 is a plan view showing one pixel of an active matrix substrate 20 included in the liquid crystal display panel 50a.

FIG. 5 is a cross-sectional view of a liquid crystal display panel 50b which is obtained by correcting the liquid crystal display panel 50a.

DESCRIPTION OF EMBODIMENTS

Embodiments of the present invention will be described in detail hereinafter with reference to the accompanying drawings. Note that the present invention is not limited to the embodiments described below.

<<Embodiment 1 of the Invention>>

Figure 1:
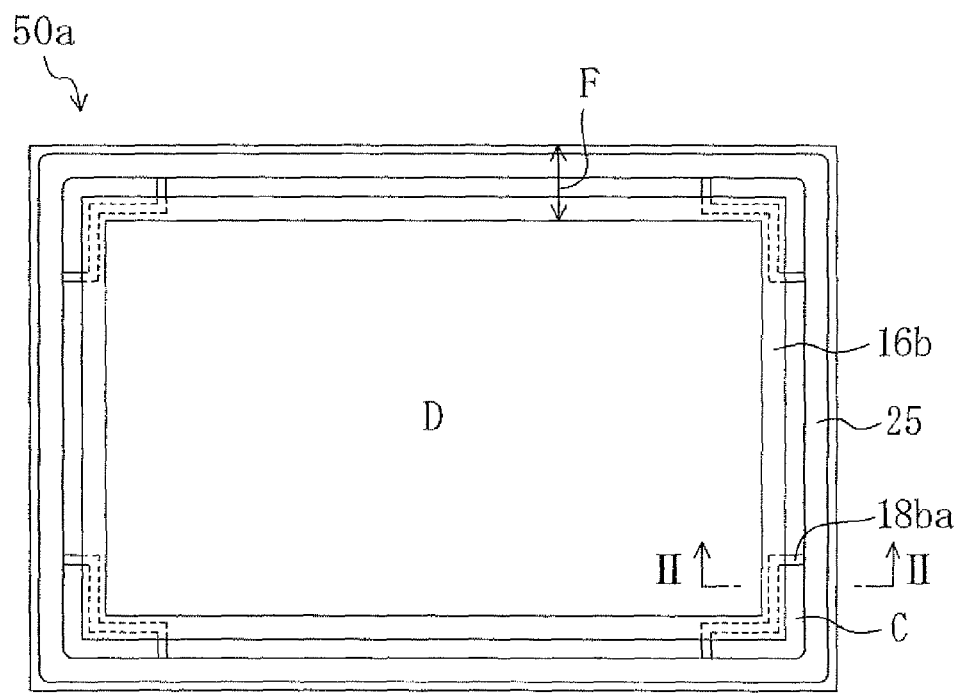
FIG. 1 is a plan view of a liquid crystal display panel 50a according to Embodiment 1.
Figure 2:
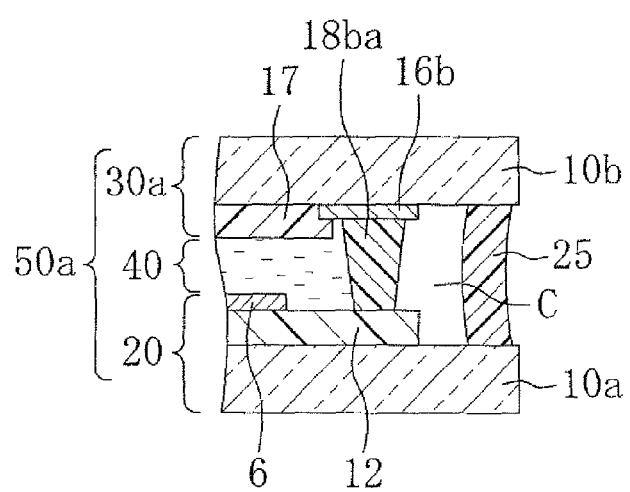
FIG. 2 is a cross-sectional view of the liquid crystal display panel 50a, taken along line II-II of FIG. 1.

FIGS. 1-5 show a liquid crystal display panel and its manufacturing method according to Embodiment 1 of the present invention. Specifically, FIG. 1 is a plan view of a liquid crystal display panel 50a of this embodiment, and FIG. 2 is a cross-sectional view of the liquid crystal display panel 50a, taken along line II-II of FIG. 1.

As shown in FIGS. 1 and 2, the liquid crystal display panel 50a includes an active matrix substrate 20 and a color filter substrate 30a which are provided as a pair of substrates arranged facing each other, a liquid crystal layer 40 provided between the active matrix substrate 20 and the color filter substrate 30a, and a sealing member 25 for bonding the active matrix substrate 20 with the color filter substrate 30a while enclosing the liquid crystal layer 40.

Figure 3:
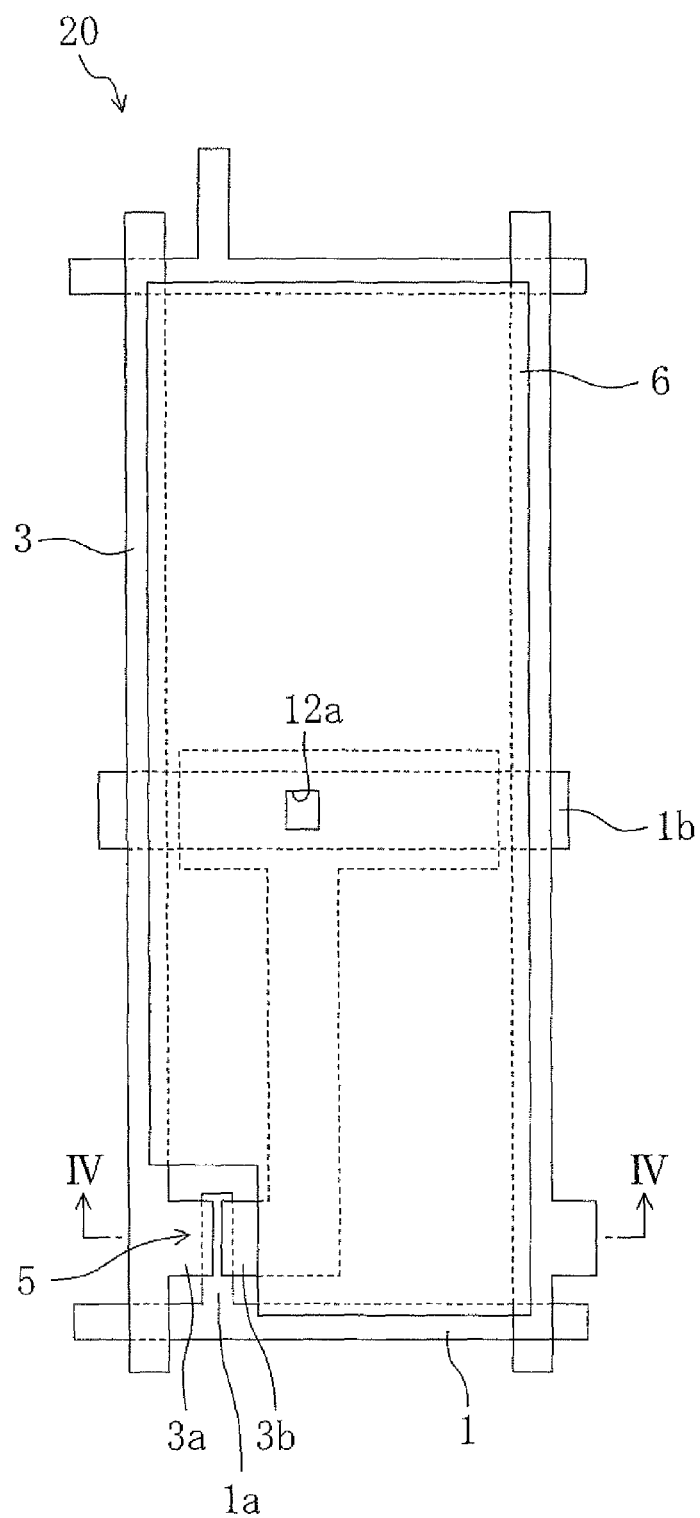
Figure 4:
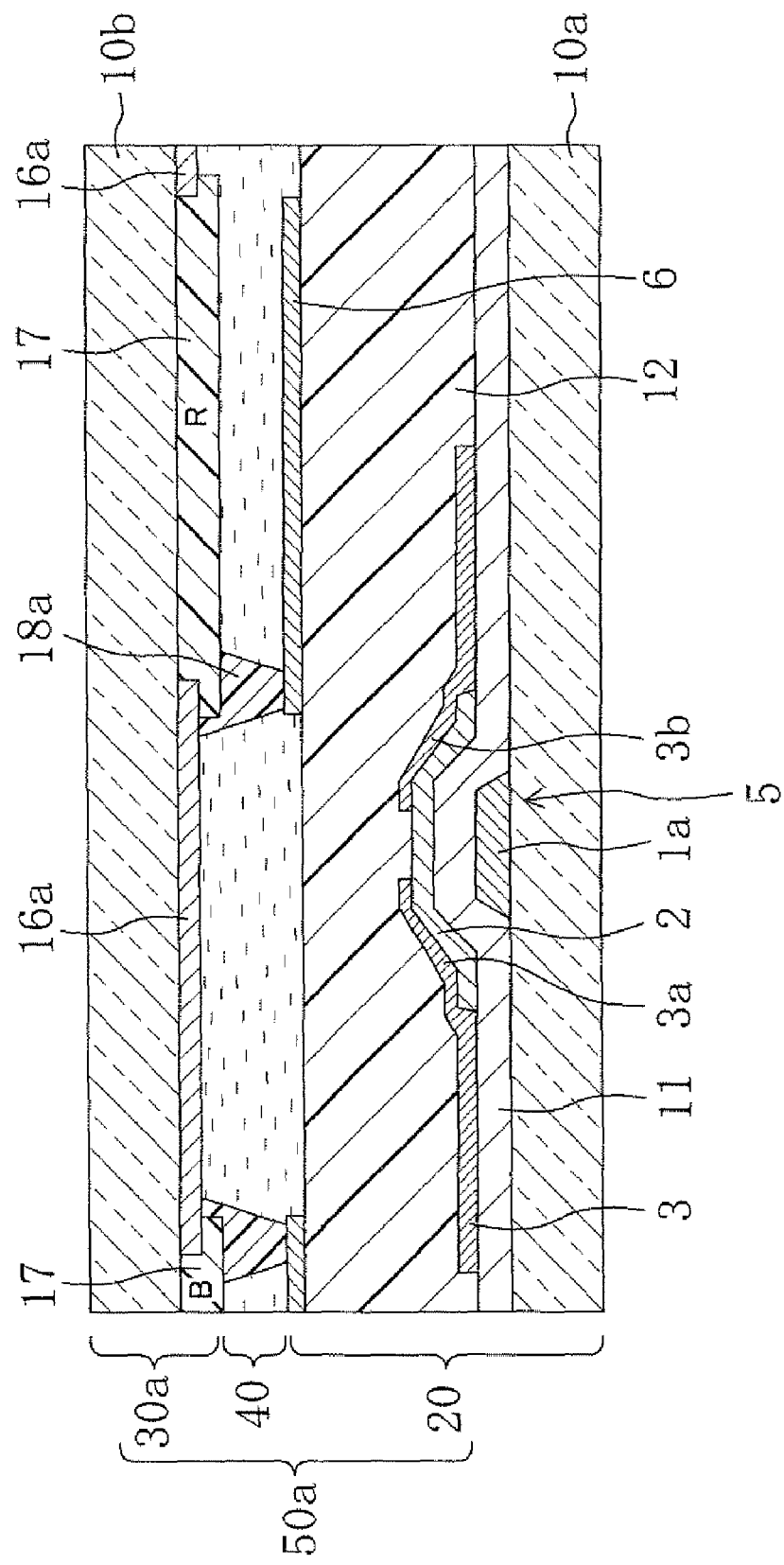
FIG. 4 is a cross-sectional view of the liquid crystal display panel 50a, taken along line IV-IV of FIG. 3.

FIG. 3 is a plan view showing one pixel of the active matrix substrate 20. FIG. 4 is a cross-sectional view of the liquid crystal display panel 50a, taken along line IV-IV of FIG. 3.

As shown in FIGS. 3 and 4, the active matrix substrate 20 includes a plurality of gate lines 1 provided on an insulating substrate 10a, extending in parallel with each other, a plurality of source lines 3 provided extending in parallel with each other and in a direction perpendicular to the gate lines 1, a plurality of TFTs (thin film transistors) 5 provided at intersections of the gate lines 1 and the source lines 3, an interlayer insulating film 12 provided covering the TFTs 5, and a plurality of pixel electrodes 6 arranged in a matrix on the interlayer insulating film 12. Note that a capacitor line lb is provided between each gate line 1, extending in parallel with the gate lines 1.

As shown in FIGS. 3 and 4, each TFT 5 includes a gate electrode 1a which is a portion of the gate line 1 protruding in a lateral direction of the gate line 1, a gate insulating film 11 provided covering the gate electrode 1a, an island-like semiconductor layer 2 located on the gate insulating film 11 at a position corresponding to the gate electrode 1a, and a source electrode 3a and a drain electrode 3b provided on the semiconductor layer 2, facing each other. Here, as shown in FIG. 3, the source electrode 3a is a portion of the source line 3 protruding in a lateral direction of the source line 3. Also, as shown in FIG. 3, the drain electrode 3b is extended to a region overlapping the capacitor line lb to form an auxiliary capacitor, and is connected to the corresponding pixel electrode 6 via a contact hole 12a formed in the interlayer insulating film 12 on the capacitor line lb.

As shown in FIGS. 1, 2 and 4, the color filter substrate 30a includes an insulating substrate 10b, black matrices 16a and 16b which are provided in the shape of a frame with a grid therein, on the insulating substrate 10b, a color filter 17 including a red layer (R), a green layer (G) and a blue layer (B), which is provided between each grid bar of the black matrices 16a and 16b, a common electrode (not shown) provided covering the color filter 17, column-like spacers 18a provided protruding from the color filter 17 via the common electrode toward the active matrix substrate 20, and cavity forming walls 18ba whose opposite ends contact the sealing member 25 and whose upper ends contact a surface of the active matrix substrate 20 to form cavity regions C.

The liquid crystal layer 40 is formed of a nematic liquid crystal material having an electro-optical property or the like.

Moreover, in the liquid crystal display panel 50a, a plurality of pixel electrodes 6 arranged in a matrix on the active matrix substrate 20 and a plurality of color layers (the color filter 17) arranged in a matrix on the color filter substrate 30a constitute a display region D which contributes to display, and the frame-like black matrix 16b provided on the color filter substrate 30a and a region outside the black matrix 16b constitute a frame region F which does not contribute to display.

Moreover, in the liquid crystal display panel 50a, in each pixel, which is an minimum unit of an image, when a gate signal is transferred from the gate line 1 to the gate electrode 1a, so that the TFT 5 is turned on, a source signal is transferred from the source line 3 to the source electrode 3a, and predetermined charge is written via the semiconductor layer 2 and the drain electrode 3b to the pixel electrode 6. In this case, there is a potential difference between each pixel electrode 6 of the active matrix substrate 20 and the common electrode of the counter substrate 30a, and a predetermined voltage is applied to the liquid crystal layer 40. Moreover, in the liquid crystal display panel 50a, an image is displayed by changing the alignment state of the liquid crystal layer 40 by changing the magnitude of the voltage applied to the liquid crystal layer 40 to adjust the light transmittance of the liquid crystal layer 40.

Next, a method for manufacturing the liquid crystal display panel 50a having the aforementioned configuration and a method for correcting it will be described by way of an example. The manufacturing method of this embodiment includes a panel fabricating step (an active matrix substrate fabricating step, a color filter substrate fabricating step, a sealing member applying step, a liquid crystal dropping step, a joining step, and a sealing member curing step), a cell gap measuring step, and a cell gap correcting step.

<Panel Fabricating Step>
-Active Matrix Substrate Fabricating Step-

Initially, a metal film made of aluminum or the like is formed on an entirety of a glass substrate (the insulating substrate 10a) having a thickness of about 0.7 mm by sputtering.

Thereafter, patterning is performed by photolithography to form the gate lines 1, the gate electrodes 1a and the capacitor lines 1b, which have a thickness of about 4000 Å.

Thereafter, a silicon nitride film or the like is formed, by CVD (Chemical Vapor Deposition), on an entirety of the substrate on which the gate lines 1, the gate electrodes 1a and the capacitor lines lb have been formed, thereby forming the gate insulating film 11 having a thickness of about 4000 Å.

Moreover, an intrinsic amorphous silicon film and a phosphorus-doped n$^+$ amorphous silicon film are successively formed, by CVD, on an entirety of the substrate on which the gate insulating film 11 has been formed. Thereafter, patterning is performed by photolithography to form an island-like pattern on the gate electrode. As a result, a semiconductor layer formation layer is formed in which the intrinsic amorphous silicon layer having a thickness of about 2000 Å and the n$^+$ amorphous silicon layer having a thickness of about 500 Å are stacked.

Thereafter, a metal film made of titanium or the like is formed, by sputtering, on an entirety of the substrate on which the semiconductor layer formation layer has been formed. Thereafter, patternining is performed by photolithography to form the source lines 3, the source electrodes 3a and the drain electrodes 3b, which have a thickness of about 2000 Å.

Next, the n+amorphous silicon layer of the semiconductor layer formation layer is etched using the source electrodes 3a and the drain electrodes 3b as a mask to form channel portions by patterning, thereby forming the semiconductor layer 2 and the TFTs 5.

Moreover, a film made of a photosensitive acrylic resin or the like is formed, by spin coating, on an entirety of the substrate on which the TFTs 5 have been formed. Thereafter, patterning is performed by photolithography to form the contact holes 12a on the drain electrodes 3b, and the interlayer insulating film 12 having a thickness of about 2 to 3 μm is then formed.

Thereafter, an ITO (Indium Tin Oxide) film is formed, by sputtering, on an entirety of the substrate on which the interlayer insulating film 12 has been formed. Thereafter, patterning is performed by photolithography to form the pixel electrodes 6 having a thickness of about 1000 Å.

Finally, a polyimide resin is applied, by a printing method, onto an entirety of the substrate on which the pixel electrodes 6 have been formed. Thereafter, a rubbing treatment is performed to form an alignment film having a thickness of about 1000 Å.

Thus, the active matrix substrate 20 can be fabricated.
-Color Filter Substrate Fabricating Step- Initially, a black colored photoresist material or the like is applied onto an entirety of a glass substrate (the insulating substrate 10b) having a thickness of about 0.7 mm. Thereafter, patterning is performed by photolithography to form the black matrices 16a and 16b having a thickness of about 1.5 μm.

Next, for example, a red, gree or blue colored photoresist material or the like is applied between each grid bar of the black matrices 16a and 16b. Thereafter, patterning is performed by photolithography to form a color layer having one selected color and having a thickness of about 2.0 μm. Moreover, a similar process is repeated for the other two colors to form color layers having the other colors and having a thickness of about 2.0 μm. Thus, the color filter 17 is formed.

Moreover, for example, an ITO film is formed on the color filter 17 by sputtering to form the common electrode having a thickness of about 1500 Å.

Thereafter, a photosensitive acrylic resin or the like is applied onto an entirety of the substrate on which the common electrode has been formed. Thereafter, patterning is performed by photolithography to form the column-like spacers 18a on the grid-like black matrix 16a and the cavity forming walls 18ba on the frame-like black matrix 16b, where the column-like spacers 18a and the cavity forming walls 18ba have a thickness of about 3.5 μm.

Finally, a polyimide resin is applied, by a printing method, onto an entirety of the substrate on which the column-like spacers 18a and the cavity forming walls 18ba have been formed. Thereafter, a rubbing treatment is performed to form an alignment film having a thickness of about 1000 Å.

Thus, the color filter substrate 30a can be formed.
-Sealing Member Applying Step- A thermal and UV curing acrylic-epoxy resin for forming the sealing member 25 is applied (drawn) in the shape of a frame, as shown in FIG. 1, using a dispenser or the like, on one (e.g., the color filter substrate 30a) of the active matrix substrate 20 fabricated in the active matrix substrate fabricating step and the color filter substrate 30a fabricated in the color filter substrate fabricating step.

-Liquid Crystal Dropping Step-

A liquid crystal material for forming the liquid crystal layer 40 is dropped onto the display region D of the color filter substrate 30a on which the acrylic-epoxy resin (the sealing member 25) has been applied in the sealing member applying step.

-Joining Step-

Initially, the color filter substrate 30a on which the liquid crystal material (40) has been dropped in the liquid crystal dropping step and the active matrix substrate 20 fabricated in the active matrix substrate fabricating step are joined with each other in vacuum in a manner which allows the display regions D of them to overlap.

Next, the active matrix substrate 20 and the color filter substrate 30a thus joined with each other are exposed to the atmosphere so that pressure is applied on the surfaces of the active matrix substrate 20 and the color filter substrate 30a.

-Sealing Member Curing Step-

The active matrix substrate 20 and the color filter substrate 30a which have been joined with each other in the joining step are subjected to UV irradiation and baking, whereby the sealing member 25 interposed between the active matrix substrate 20 and the color filter substrate 30a is cured to enclose the liquid crystal layer 40.

Thus, the liquid crystal display panel 50a can be manufactured.

<Cell Gap Measuring Step>

A cell gap of the liquid crystal display panel 50a manufactured in the panel fabricating step is measured by retardation measurement with a rotating analyzer method using a cell gap inspection system (RETS manufactured by OTSUKA ELECTRONICS CO., LTD.). Here, when the measured cell gap is a predetermined distance, e.g., a standard cell gap is 4.00 μm (acceptable range: 3.95 μm to 4.05 μm) and the measured cell gap falls within the acceptable range, the panel is determined to be good or non-defective. When the measured cell gap is larger than the predetermined distance, e.g., the measured cell gap exceeds 4.05 μm, the panel is determined to be defective, and the following cell gap correcting step is performed.

<Cell Gap Correcting Step>

Figure 5:
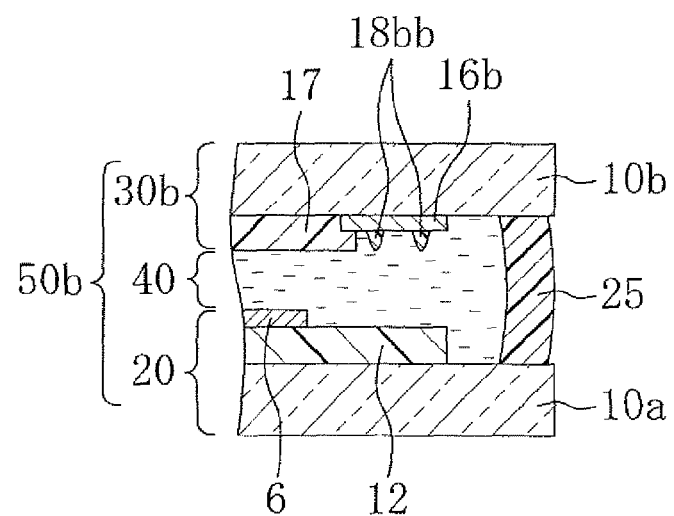

In the liquid crystal display panel 50a which has been determined to be defective in the cell gap measuring step, the cavity forming wall 18ba is irradiated with laser light, such as YAG laser or the like, through the active matrix substrate 20 so as to destroy at least a portion of the cavity forming wall 18ba, whereby a portion of the liquid crystal material (40) of the liquid crystal layer 40 is caused to flow into the cavity region C, as shown in FIG. 5. Note that FIG. 5 is a cross-sectional view of a liquid crystal display panel 50b which is the liquid crystal display panel 50a whose cell gap is corrected. Moreover, in a color filter substrate 30b of FIG. 5, the cavity forming wall 18ba which had been foimed in the corresponding color filter substrate 30a of FIG. 2 is destroyed, leaving residues 18bb. As a result, an extra amount of the liquid crystal material (40) which causes an excessive cell gap is moved into the cavity region, whereby the liquid crystal display panel 50b in which the excessive cell gap is corrected can be manufactured.

As described above, according to the liquid crystal display panels 50a and 50b and their manufacturing methods of this embodiment, in the liquid crystal display panel 50a fabricated in the panel fabricating step, the cavity forming wall 18ba provided on the color filter substrate 30a has opposite ends contacting the sealing member 25 and an upper end contacting a surface of the active matrix substrate 20. As a result, the cavity region C surrounded by the sealing member 25 and the cavity forming wall 18ba is formed between the active matrix substrate 20 and the color filter substrate 30a. Therefore, the cavity region C is adjacent via the cavity forming wall 18ba to the liquid crystal layer 40 which is enclosed between the active matrix substrate 20 and the color filter substrate 30a by the frame-like sealing member 25. Therefore, in the cell gap measuring step, when a measured interval (cell gap) between the active matrix substrate 20 and the color filter substrate 30a is larger than a predetermined distance, and it is determined that an excessive amount of liquid crystal material (40) is enclosed, the cavity forming wall 18ba is destroyed in the cell gap correcting step, whereby a portion of the liquid crystal material (40) is caused to flow through a destroyed portion of the cavity forming wall 18ba into the cavity region C. As a result, an extra amount of the liquid crystal material (40) which causes an excessive cell gap is moved to the cavity region, so that the excessive cell gap is corrected. Therefore, it is possible to substantially reduce an excessive cell gap in the liquid crystal display panel 50a in which an excessive amount of liquid crystal material (40) is enclosed. Moreover, as an excessive cell gap can be substantially reduced, a display disturbance due to an external force can be substantially reduced. Moreover, as the excessive cell gap of the liquid crystal display panel 50a can be corrected, the yield of manufacture of the liquid crystal display panel can be improved. Moreover, the cavity region C formed between the active matrix substrate 20 and the color filter substrate 30a reduces the amount of a liquid crystal material enclosed between the active matrix substrate 20 and the color filter substrate 30a, resulting in a reduction in the cost of the material.

Moreover, according to the liquid crystal display panels 50a and 50b and their manufacturing methods of this embodiment, the cavity forming wall 18ba and the cavity region C are formed in the frame region F in which the black matrix 161) is provided and therefore which does not contribute to display, the excessive cell gap can be corrected without affecting display.

Moreover, according to the liquid crystal display panels 50a and 50b and their manufacturing methods of this embodiment, the cavity forming wall 18ba is formed in the same layer as and of the same material as those of the column-like spacer 18a of the display region D. Therefore, the cavity forming wall 18ba can be formed on the color filter substrate 30a without providing an additional manufacturing step.

Moreover, according to the liquid crystal display panels 50a and 50b and their manufacturing methods of this embodiment, the cavity forming wall 18ba can be destroyed by laser irradiation with high accuracy in the cell gap correcting step. Therefor; an excessive cell gap can be reliably corrected by causing a portion of a liquid crystal material (40) to flow through a destroyed portion of the cavity forming wall 18ba into the cavity region C.

<<Embodiment 2 of the Invention>>

Figure 6:
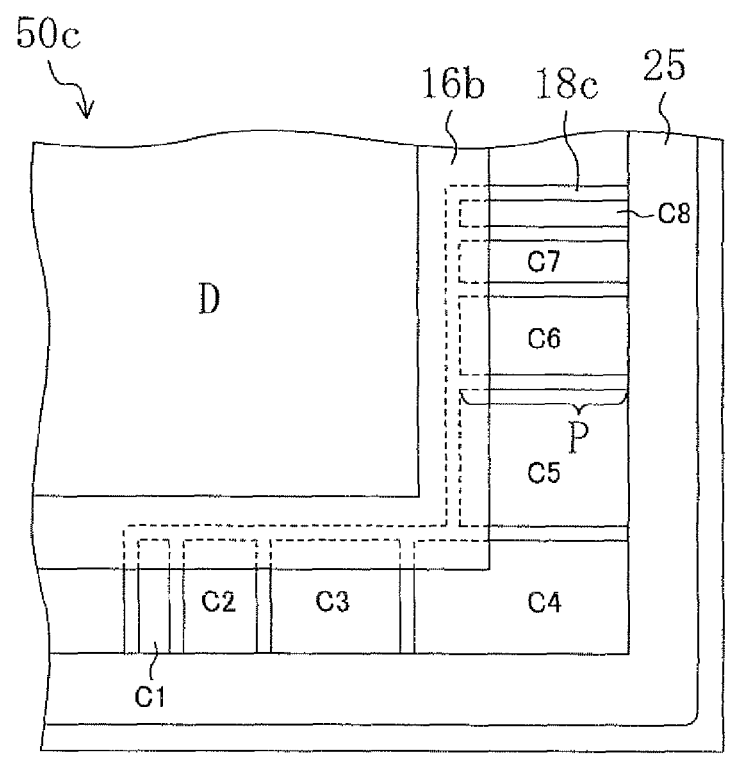
FIG. 6 is a plan view of a liquid crystal display panel 50c according to Embodiment 2.

FIG. 6 is a plan view showing a corner portion of a liquid crystal display panel 50c of this embodiment. Note that, in embodiments described below, the same portions as those of FIGS. 1-5 are indicated by the same reference characters and will not be described in detail.

As shown in FIG. 6, a cavity forming wall 18c of the liquid crystal display panel 50c has a plurality of partition walls P whose tip ends contact the sealing member 25 and whose upper ends contact the active matrix substrate, and the partition walls P divide the cavity region C of Embodiment 1 into a plurality of cavity regions C1-C8 having different sizes. Therefore, in the cell gap correcting step of Embodiment 1, when an excessive cell gap is corrected, at least a portion of the cavity forming wall 18c may be destroyed, corresponding to an extra amount of an enclosed liquid crystal material, whereby the extra amount of the liquid crystal material may be caused to flow into one of the cavity regions C1-C8 which corresponds to the extra amount of the liquid crystal material.

According to the liquid crystal display panel 50c and its manufacturing method of this embodiment, the division cavity regions C1-C8 have different sizes, and therefore, by causing an extra amount of a liquid crystal material to flow into one of the cavity regions C1-C8 which has a size corresponding to the extra amount of the liquid crystal material, an excessive cell gap can be corrected with high accuracy.

<<Embodiment 3 of the Invention>>

Figure 7:
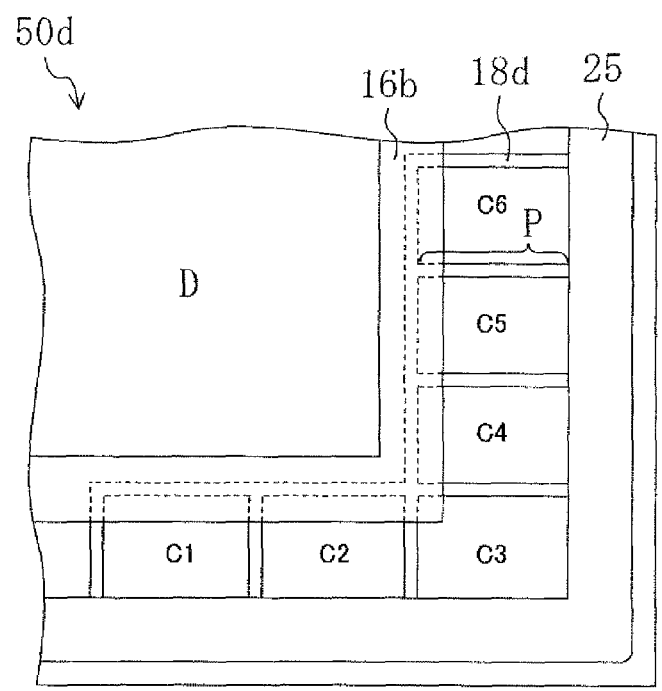
FIG. 7 is a plan view of a liquid crystal display panel 50d according to Embodiment 3.

FIG. 7 is a plan view showing a corner portion of a liquid crystal display panel 50d of this embodiment.

As shown in FIG. 7, a cavity forming wall 18d of the liquid crystal display panel 50d has a plurality of partition walls P whose tip ends contact a sealing member 25 and whose upper ends contact an active matrix substrate, and the partition walls P divide the cavity region C of Embodiment 1 into a plurality of cavity regions C1-C6 having equal sizes. Therefore, in the cell gap correcting step of Embodiment 1, when an excessive cell gap is corrected, at least a portion of the cavity forming wall 18d may be destroyed, corresponding to an extra amount of an enclosed liquid crystal material, whereby the extra amount of the liquid crystal material may be caused to flow into one or more of the cavity regions C1-C6 which correspond to the extra amount of the liquid crystal material.

According to the liquid crystal display panel 50d and its manufacturing method of this embodiment, the division cavity regions C1-C6 have equal sizes, and therefore, by causing an extra amount of a liquid crystal material to flow into one or more of the cavity regions C1-C6 the number of which corresponds to the extra amount of the liquid crystal material, an excessive cell gap can be corrected with high accuracy.

<<Embodiment 4 of the Invention<<

Figure 8:
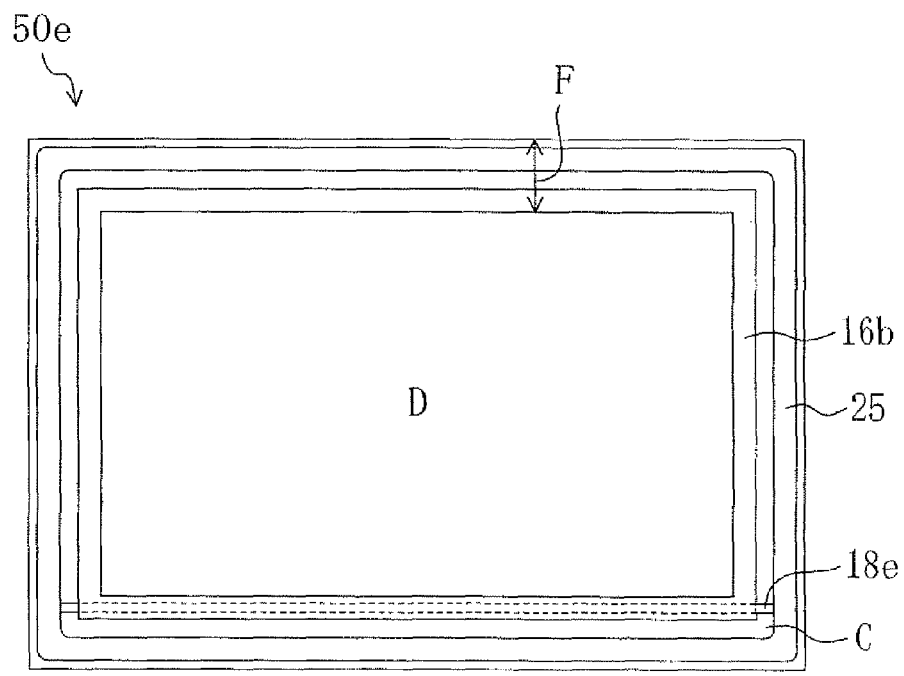
FIG. 8 is a plan view of a liquid crystal display panel 50e according to Embodiment 4.

FIG. 8 is a plan view of a liquid crystal display panel 50e of this embodiment.

As shown in FIG. 8, in the liquid crystal display panel 50; a cavity forming wall 18e is formed along a lower side of a frame-like sealing member 25. Therefore, in the cell gap correcting step of Embodiment 1, when an excessive cell gap is corrected, the cavity forming wall 18e may be destroyed so that an extra amount of a liquid crystal material is caused to flow into a lower cavity region C.

According to the liquid crystal display panel 50e and its manufacturing method of this embodiment, the cavity forming wall 18e is provided along a side of the sealing member 25 which is located at a lower portion when the liquid crystal display panel 50e is caused to stand upright. Therefore, when the cavity forming wall 18e is destroyed, an extra amount of a liquid crystal material is caused to quickly flow into the cavity region C due to the action of the force of gravity, whereby an excessive cell gap can be quickly corrected.

<<Embodiment 5 of the Invention>>

Figure 9:
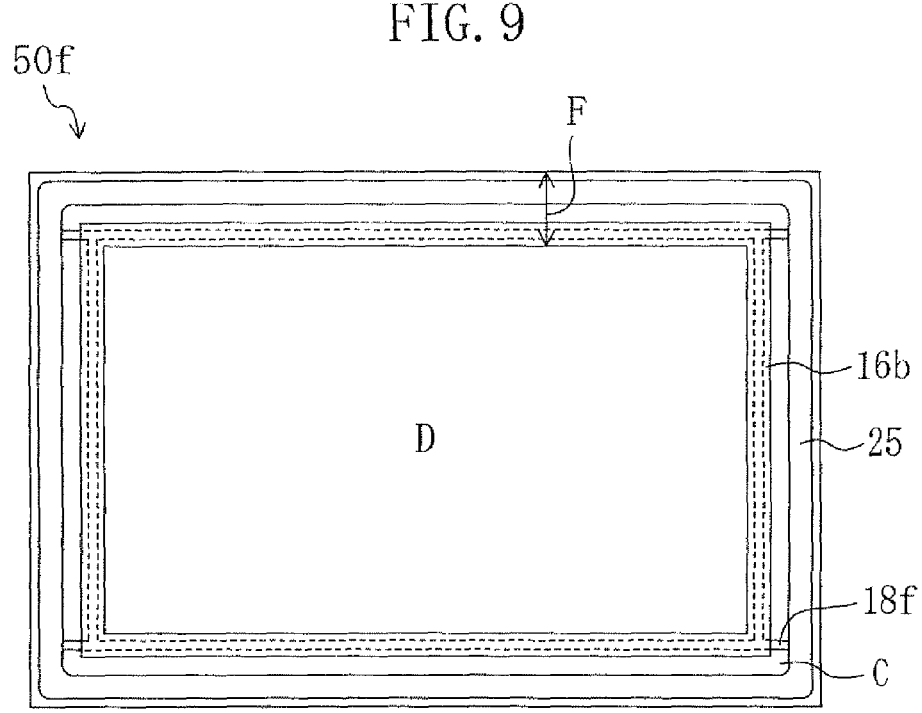
FIG. 9 is a plan view of a liquid crystal display panel 50f according to Embodiment 5.

FIG. 9 is a plan view of a liquid crystal display panel 50f of this embodiment.

As shown in FIG. 9, in the liquid crystal display panel 50f, a cavity forming wall 18f is formed along each side of the frame-like sealing member 25. Therefore, in the cell gap correcting step of Embodiment 1, when an excessive cell gap is corrected, the cavity forming wall 18f may be destroyed so that an extra amount of a liquid crystal material is caused to flow into a surrounding cavity region C.

According to the liquid crystal display panel 50f and its manufacturing method of this embodiment, the cavity forming wall 18f is provided along each side of the sealing member 25, and therefore, the capacity of the cavity region C for causing an extra amount of a liquid crystal material to flow thereinto can be maximized.

<<Embodiment 6 of the Invention>>

Figure 10:
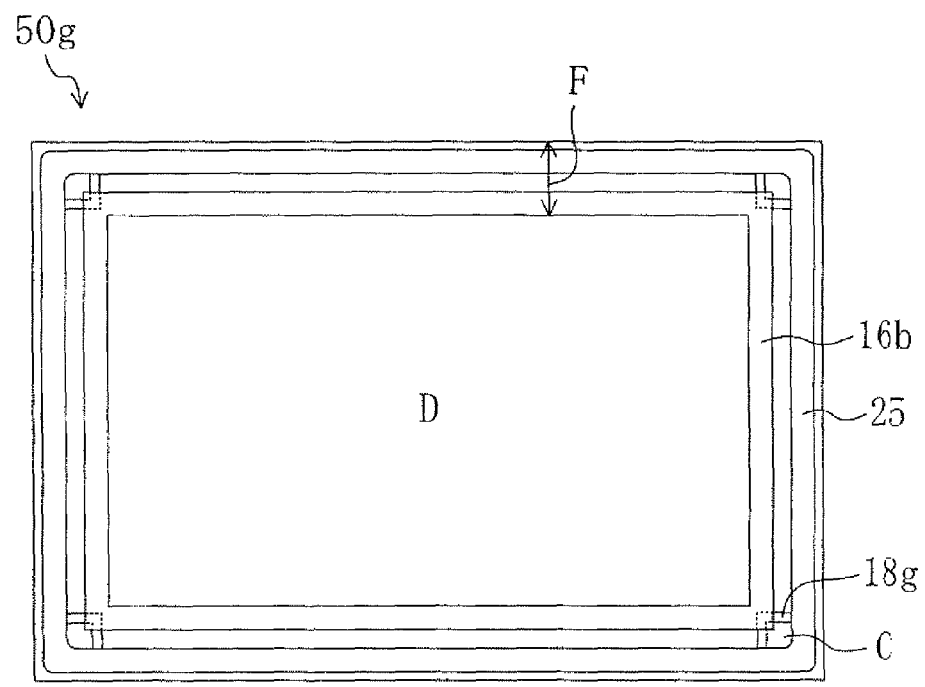
FIG. 10 is a plan view of a liquid crystal display panel 50g according to Embodiment 6.

FIG. 10 is a plan view of a liquid crystal display panel 50g of this embodiment.

As shown in FIG. 10, in the liquid crystal display panel 50g, a cavity forming wall 18g is formed at only four corner portions of the frame-like sealing member 25. Therefore, in the cell gap correcting step of Embodiment 1, when an excessive cell gap is corrected, the cavity forming wall 18g may be destroyed so that an extra amount of a liquid crystal material is caused to flow into cavity regions C at the four corner portions.

According to the liquid crystal display panel 50g and its manufacturing method of this embodiment, as there are generally not many wirings for display (e.g., lead wirings for the gate lines 1 and the source lines 3, etc.) at the four corner portions of the sealing member 25, the cavity forming wall 18g can be formed while substantially reducing its overlapping the display wirings. Therefore, bumps on an upper end of the cavity forming wall 18g are reduced, and therefore, the tightness between the upper end of the cavity forming wall 18g and the surface of the active matrix substrate is improved, whereby the cavity region C can be reliably formed.

<<Other Embodiments>>

Figure 11:
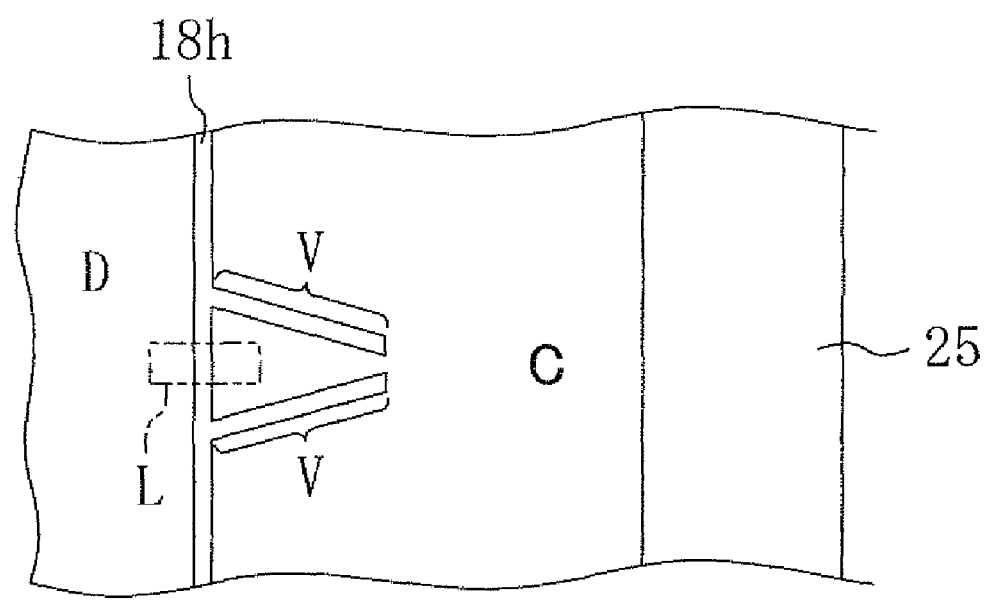
FIG. 11 is a plan view of a cavity forming wall 18h included in a liquid crystal display panel according to another embodiment.

FIG. 11 is a plan view of a cavity forming wall 18h included in a liquid crystal display panel of this embodiment.

As shown in FIG. 11, in this liquid crystal display panel, the cavity forming wall 18h has a pair of anti-backflow valves V which are walls protruding toward the sealing member 25. Therefore, in the cell gap correcting step of Embodiment 1, when an excessive cell gap is corrected, a portion of the cavity forming wall 18h may be destroyed by irradiating a region L with laser light so that an extra amount of a liquid crystal material is caused to flow into a cavity region C, as shown in FIG. 11.

According to the liquid crystal display panel and its manufacturing method of this embodiment, the cavity forming wall 18h has the pair of anti-backflow valves V on a side thereof closer to the sealing member 25. Therefore, when a vacuum bubble is present between the liquid crystal layer 40 and the sealing member 25, it is possible to substantially reduce the vacuum bubble or the like flowing into the display region D.

The cavity forming walls 18ba and 18c-18h which are formed in the same layer as and of the same material as those of the column-like spacer 18a are illustrated in the aforementined embodiments. Alternatively, in the present invention, the cavity forming walls may be formed of an organic resin film of each color layer included in the color filter provided on the color filter substrate, the interlayer insulating film provided on the active matrix substrate or the like, an additionally formed inorganic flim made of an SOG (Spin on Glass) material or the like, a multilayer structure thereof, or the like.

Moreover, the cavity region C which is surrounded by the sealing member 25 and each of the cavity forming walls 18ba and 18e-18h is illustrated in the aforementioned embodiments. Alternatively, in the present invention, the cavity region may be fanned and surrounded only by a cavity forming wall between the liquid crystal layer 40 and the sealing member 25.

Although the liquid crystal display panels illustrated in the aforementioned embodiments are of the active matrix drive type, the present invention is also applicable to passive matrix drive type liquid crystal display panels.

Industrial Applicability

As described above, in the present invention, a cell gap can be corrected in liquid crystal display panels manufactured by the one drop fill method. Therefore, the present invention is useful for manufacture of large-size liquid crystal display panels for which the one drop fill method is a mainstream method.

DESCRIPTION OF REFERENCE CHARACTERS

C Cavity Region
D Display Region
F Frame Region
P Partition Wall.
V Anti-Backflow Valve (Protruding Wall)
16b Black Matrix (Light Shielding Layer)
18a Column-like Spacer (Resin Layer)
18ba, 18c-18h Cavity Forming Wall
20 Active Matrix Substrate (Other Substrate)
25 Sealing Member
30a, 30b Color Filter Substrate (One Substrate)
40 Liquid Crystal Layer (Liquid Crystal Material)
50a-50d, 50f, 50g Liquid Crystal Display Panel

The invention claimed is:

1. A liquid crystal display panel comprising:
   a pair of substrates arranged facing each other;
   a liquid crystal layer provided between the pair of substrates. and
   a frame-like sealing member configured to bond the pair of substrates with each other and enclose the liquid crystal layer, wherein:
   a cavity forming wall is provided on one of the pair of substrates between the liquid crystal layer and the sealing member and is configured to form a cavity region therein by an upper end of the cavity forming wall contacting the other of the pair of substrates,
   the cavity region is configured so that, when an excessive amount of a liquid crystal material which forms the liquid crystal layer is enclosed, the cavity forming wall is destroyed to cause a portion of the liquid crystal material to flow into the cavity region, and
   the cavity forming wall is configured to have opposite ends contacting the sealing member.

2. The liquid crystal display panel of claim 1, wherein
a display region which contributes to display and a frame region which is provided around the display region and does not contribute to display, are provided,
a frame-like light shielding layer is provided in the frame region of the one of the pair of substrates, and
the cavity forming wall is provided, overlapping the light shielding layer.

3. The liquid crystal display panel of claim 1, wherein the cavity forming wall is provided at four corner portions of the sealing member.

4. The liquid crystal display panel of claim 1, wherein the cavity forming wall is provided, extending along a side of the sealing member.

5. The liquid crystal display panel of claim 1, wherein the cavity forming wall is provided, extending along each side of the sealing member.

6. The liquid crystal display panel of claim 1, wherein
the cavity forming wall has a partition wall having a tip end contacting the sealing member and an upper end contacting the other of the pair of substrates, thereby dividing the cavity region into a plurality of parts.

7. The liquid crystal display panel of claim 6, wherein
the plurality of parts of the cavity regions separated by the partition wall have different sizes.

8. The liquid crystal display panel of claim 6, wherein
the plurality of parts of the cavity regions separated by the partition wall have equal sizes.

9. The liquid crystal display panel of claim 1, wherein
the cavity forming wall have a wall protruding toward the sealing member so as to substantially reduce backflow of a fluid.

10. The liquid crystal display panel of claim 1, wherein a resin layer is provided on one of the pair of substrates in a display region which contributes to display, and the cavity forming wall is formed in the same layer as and of the same material as those of the resin layer.

* * * * *